United States Patent
Hamamura

(10) Patent No.: US 10,328,673 B2
(45) Date of Patent: Jun. 25, 2019

(54) METHOD OF PRODUCING LAMINATED STEEL PLATE AND DEVICE FOR PRODUCING THE SAME

(71) Applicant: Honda Motor Co.,Ltd., Tokyo (JP)

(72) Inventor: Go Hamamura, Saitama (JP)

(73) Assignee: Honda Motor Co.,Ltd., Tokyo (JP)

( * ) Notice: Subject to any disclaimer, the term of this patent is extended or adjusted under 35 U.S.C. 154(b) by 19 days.

(21) Appl. No.: 15/660,973

(22) Filed: Jul. 27, 2017

(65) Prior Publication Data

US 2018/0056629 A1 Mar. 1, 2018

(30) Foreign Application Priority Data

Aug. 29, 2016 (JP) ................. 2016-167277

(51) Int. Cl.
| | | |
|---|---|---|
| B32B 15/01 | (2006.01) | |
| H02K 15/02 | (2006.01) | |
| H02K 1/18 | (2006.01) | |
| B32B 37/12 | (2006.01) | |
| B32B 7/12 | (2006.01) | |

(52) U.S. Cl.
CPC .............. *B32B 15/011* (2013.01); *B32B 7/12* (2013.01); *B32B 37/12* (2013.01); *H02K 1/185* (2013.01); *H02K 15/024* (2013.01); *B32B 2311/30* (2013.01); *B32B 2457/00* (2013.01); *B32B 2605/08* (2013.01)

(58) Field of Classification Search
USPC ... 156/60, 250, 261, 264, 265, 306.9, 307.1, 156/307.3, 307.7, 510, 518, 520, 524, 156/532, 538, 547, 566, 578
See application file for complete search history.

(56) References Cited

U.S. PATENT DOCUMENTS

2013/0160622 A1* 6/2013 Shigematsu ......... H02K 15/024 83/23

FOREIGN PATENT DOCUMENTS

| JP | S49100155 | 9/1974 |
|---|---|---|
| JP | 2007-159300 | 6/2007 |
| JP | 2009-5539 | 1/2009 |
| JP | 2009-124828 | 6/2009 |

OTHER PUBLICATIONS

"Office Action of Japan Counterpart Application," dated Nov. 28, 2017, with partial English translation, p. 1-p.4, in which the listed references were cited.

* cited by examiner

*Primary Examiner* — Sing P Chan
(74) *Attorney, Agent, or Firm* — JCIPRNET

(57) ABSTRACT

To provide a method of producing a laminated steel plate through which no conduction occurs between steel plates and productivity does not decrease.

A method of producing a laminated steel plate by laminating a plurality of steel plates (1), including a coating process (P2) in which an adhesive (8) is applied to a surface (1*a*) of the steel plate (1) and a laminating process (P3) in which the steel plate (1) to which the adhesive (8) is applied and another steel plate (1) are laminated while shifting positions around an axis (C1), and the steel plate (1) and a laminate (12) are adhered using the adhesive (8).

11 Claims, 9 Drawing Sheets

METHOD OF PRODUCING LAMINATED STEEL PLATE AND DEVICE FOR PRODUCING THE SAME

CROSS-REFERENCE TO RELATED APPLICATION

This application claims the priority benefit of Japan Application no. 2016-167277, filed on Aug. 29, 2016. The entirety of the above-mentioned patent application is hereby incorporated by reference herein and made a part of this specification.

BACKGROUND OF THE INVENTION

Field of the Invention

The present invention relates to a method of producing a laminated steel plate and a device for producing the same.

Description of Related Art

An electric motor used in a hybrid car and the like includes, for example, a rotor and a stator that generates a rotating magnetic field. A stator core of the stator is formed of a laminated steel plate obtained by laminating steel plates. A plurality of steel plates constituting the laminated steel plate are fixed to each other by formation of a caulked part, adhesion using an adhesive, or the like (refer to Patent Document 1 and Patent Document 2).

For example, the stator core is prepared as follows. An annular steel plate is prepared by punching processing or the like, and a plurality of steel plates (for example, several tens to several hundreds of steel plates) are laminated. In order to equalize a lamination thickness of the steel plates in a circumferential direction, steel plates are laminated by shifting circumferential direction positions for each of a predetermined number of steel plates.

When fixing is performed by caulked parts, caulked parts are formed on a laminated steel plate according to press processing. When fixing is performed using an adhesive, steel plates in which an adhesive layer is formed in advance are laminated.

PRIOR ART DOCUMENT

Patent Documents

[Patent Document 1] Japanese Unexamined Patent Application No. 2007-159300
[Patent Document 2] Japanese Unexamined Patent Application No. 2009-5539

SUMMARY OF THE INVENTION

However, in the above-described production method, when fixing is performed by caulked parts, there is a possibility of loss occurring due to conduction between steel plates in the caulked parts.

In addition, when fixing is performed using an adhesive, it is necessary to form an adhesive layer in steel plates in advance. In addition, after steel plates are prepared by punching processing or the like, a process in which the steel plates are removed from a production device and manually laminated, and an adhesive is cured by heat is necessary. Therefore, there is a problem of productivity being lowered.

The present invention has been made in view of the above circumstances and provides a method of producing a laminated steel plate and a device for producing the same through which conduction between steel plates does not occur and productivity does not decrease.

An invention described in claim 1 provides a method of producing a laminated steel plate (for example, a stator core 10 in an embodiment) by laminating a plurality of steel plates (for example, an annular plate 1 in the embodiment), including a coating process (for example, a second process P2 in the embodiment) in which an adhesive (for example, an adhesive 8 in the embodiment) is applied to a surface (for example, a surface 1a in the embodiment) of the steel plate and a laminating process (for example, a third process P3 in the embodiment) in which the steel plate to which the adhesive is applied and another steel plate (for example, a laminate 12 in the embodiment) are laminated while shifting positions around an axis in a thickness direction of the steel plate and the steel plate to which the adhesive is applied and the other steel plate are adhered using the adhesive.

An invention described in claim 2 provides the method of producing a laminated steel plate according to claim 1 wherein, in the coating process, the adhesive is applied annularly to a surface of the steel plate.

An invention described in claim 3 provides the method of producing a laminated steel plate according to claim 1 or 2 wherein all of the steel plates to which the adhesive is applied in the coating process are subjected to the laminating process.

An invention described in claim 4 provides the method of producing a laminated steel plate according to any one of claims 1 to 3 wherein the coating process and the laminating process are performed in a common production device (for example, a production device 4 in the embodiment).

An invention described in claim 5 provides a device for producing a laminated steel plate by laminating a plurality of steel plates including a coating unit (for example, a supply unit 15 in the embodiment) configured to apply an adhesive to a surface of the steel plate; and a lamination unit (for example, a lamination part 16 in the embodiment) configured to laminate the steel plate to which the adhesive is applied and another steel plate while shifting positions around an axis in a thickness direction of the steel plate and adhere the steel plate to which the adhesive is applied and the other steel plate using the adhesive.

According to the invention in claim 1, since the steel plate to which the adhesive is applied and another steel plate are laminated while shifting positions around the axis, the adhesive is applied over a wide range around the axis. Therefore, even if a shear force is applied to an adhesive layer in the curing process, stress concentration is unlikely to occur and inhibition of a curing reaction due to the shear stress is unlikely to occur. Therefore, it is possible to increase an adhesive strength of the adhesive layer, and minimize an amount of the adhesive used. Accordingly, it is possible to reduce a time required for curing, increase a production speed, and reduce production costs.

According to the invention in claim 1, since the steel plates are adhered and fixed to each other with the adhesive layer therebetween, no conduction occurs between the steel plates and an increase in loss can be prevented. In addition, since the process is simplified, productivity does not decrease.

According to the invention in claim 2, since the adhesive is applied annularly to a surface of the steel plate, the above-described stress concentration is highly unlikely to occur.

According to the invention in claim 3, since all of the steel plates to which the adhesive is applied in the coating process are subjected to the laminating process, deviation is unlikely to occur in a circumferential direction of a lamination thickness of the steel plates in the laminated steel plate. In addition, flatness of the laminated steel plate is favorable. Accordingly, it is possible to increase dimensional accuracy of the laminated steel plate.

According to the invention in claim 4, since the coating process and the laminating process are performed in a common production device, it is possible to increase productivity compared with in a production method in which an operation of removing steel plates from a production device and laminating them is necessary.

According to the invention in claim 5, since the lamination unit is configured to laminate the steel plate to which the adhesive is applied and another steel plate while shifting positions around the axis, it is possible to apply the adhesive over a wide range around the axis. Therefore, even if a shear force is applied to the adhesive layer in the curing process, stress concentration is unlikely to occur, and inhibition of a curing reaction due to the shear stress is unlikely to occur. Therefore, it is possible to increase an adhesive strength of the adhesive layer and minimize an amount of the adhesive used. Accordingly, it is possible to reduce a time required for curing, increase a production speed, and reduce production costs.

According to the invention in claim 5, since the steel plates are adhered and fixed to each other with the adhesive layer therebetween, no conduction occurs between the steel plates and an increase in loss can be prevented. In addition, since the process is simplified, productivity does not decrease.

DESCRIPTION OF THE EMBODIMENTS

Embodiments of the present invention will be described below with reference to the drawings.

[Laminated Steel Plate]

First, an exemplary electric motor to which a laminated steel plate obtained using a production method of an embodiment can be applied will be described.

For example, an electric motor includes a rotor and a stator that generates a rotating magnetic field. A stator core of the stator is formed in a cylindrical shape. The stator core on which a coil is wound is fixed to a housing by a fixture. In order to reduce an induced current or the like, the stator core is formed of a laminated steel plate obtained by laminating a plurality of steel plates.

Figure 4:
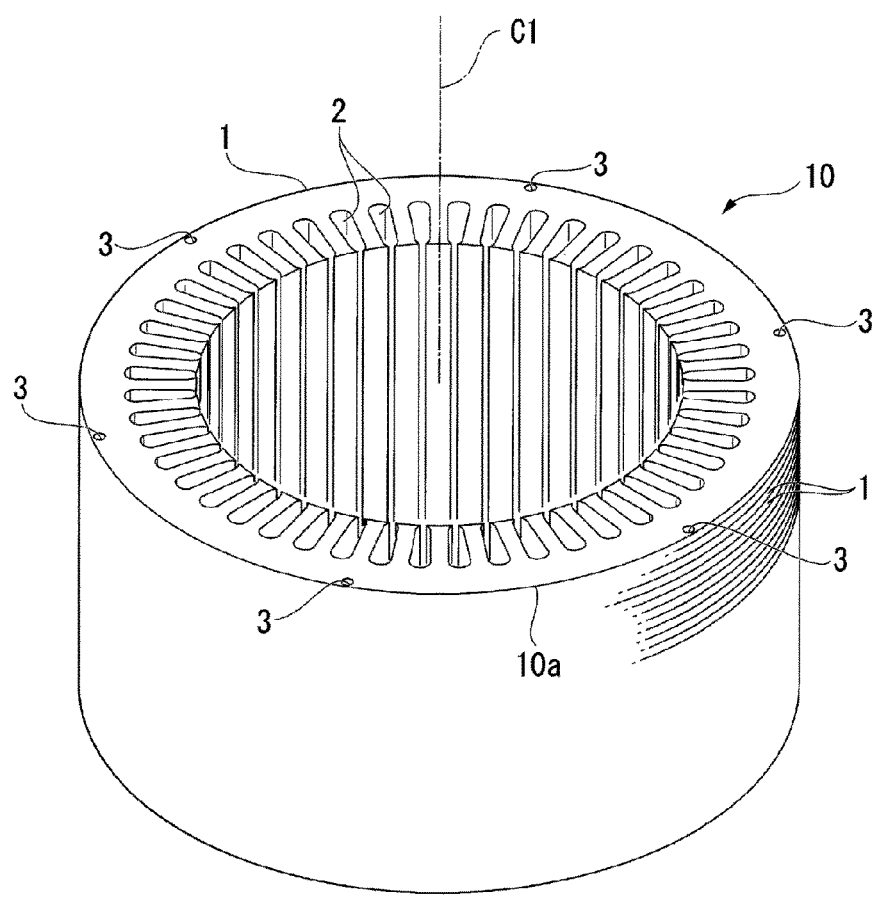
FIG. 4 is a perspective view of a stator core that is an example of a laminated steel plate obtained by a production method according to the first embodiment.

FIG. 4 is a perspective view of an example of a stator core. A stator core 10 is a laminated steel plate obtained by laminating a plurality of annular plates 1 (steel plates) in the same shape. The stator core 10 includes a plurality of coil slots 2 and a plurality of insertion holes 3 into which the above-described fixture (such as a bolt) is inserted. The number of annular plates 1 constituting the stator core 10 is, for example, 300.

The annular plate 1 is formed of a steel plate (for example, an electromagnetic steel sheet). The annular plate 1 is generally formed in an annular shape. An external shape of the annular plate 1 is, for example, a circular shape in a plan view.

The insertion holes 3 are formed at positions close to an outer peripheral edge 10a of the stator core 10. For example, the plurality of insertion holes 3 are formed at rotationally symmetric positions of n-fold symmetry (n is an integer of 2 or more) with respect to a central axis C1 of the stator core 10. For example, the insertion holes 3 are formed at rotationally symmetric positions of 6-fold symmetry. The central axis C1 is along a thickness direction of the annular plate 1.

[Device for Producing Laminated Steel Plate]

Next, a method of producing a laminated steel plate of a first embodiment will be described by exemplifying a case in which the stator core 10 (laminated steel plate) is produced.

Figure 1:
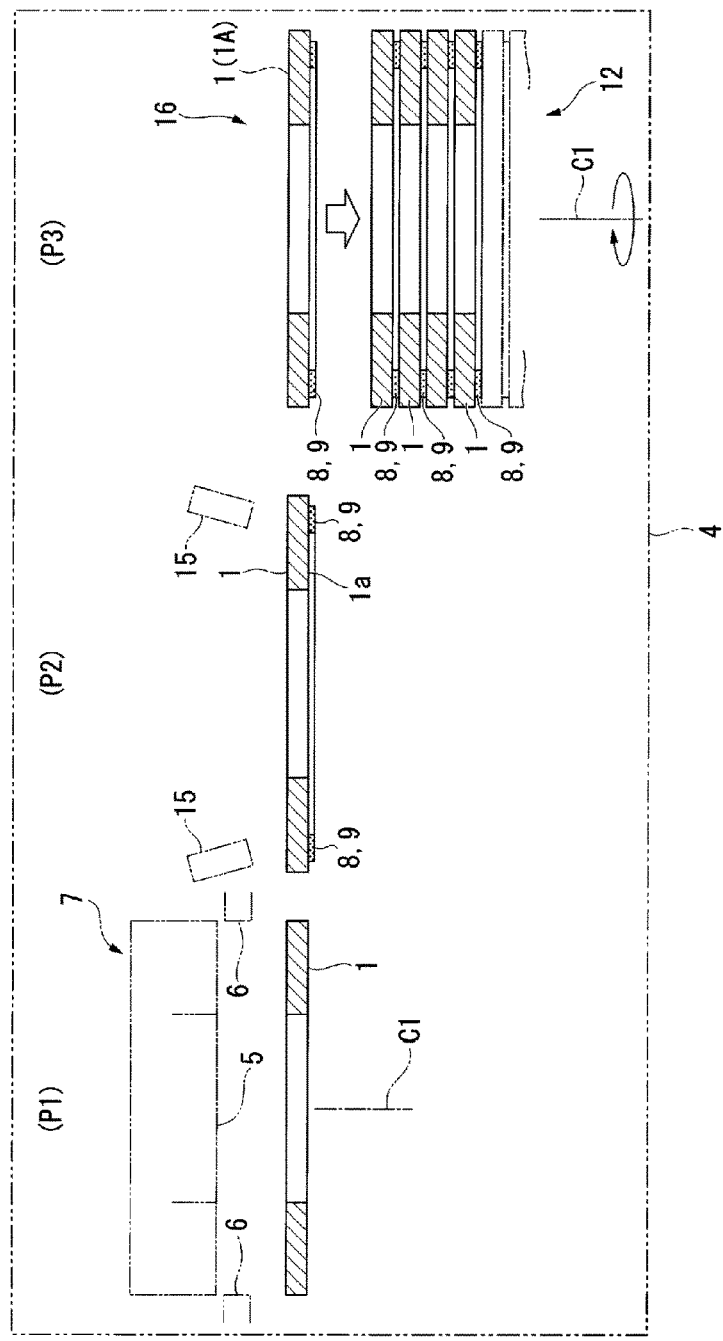
FIG. 1 is a diagram describing a production method of a laminated steel plate according to a first embodiment.

In the production method, using a production device 4 of a laminated steel plate shown in FIG. 1, the stator core 10 is prepared in first to third processes P1, P2, and P3.

The production device 4 includes a punching mold 7 (punching processing part) that punches the annular plate 1, a supply unit 15 (a coating unit) such as a nozzle by which an adhesive 8 is applied to a surface 1a of the annular plate 1, and a lamination part 16 (a lamination unit) configured to laminate the annular plate 1 on a laminate 12 while shifting a circumferential direction position of the laminate 12.

The punching mold 7 includes an upper mold 5 (punch) and a lower mold 6 (die).

[Method of Producing Laminated Steel Plate] (First Embodiment)

Processes will be described in detail below.

(First Process P1)

A steel plate material (not shown) made of an electromagnetic steel sheet is prepared. Press oil for pressing to be described below may be applied to one surface of the steel plate material. In addition, a primer may be applied to the surface of the steel plate material in order to increase an adhesive strength of an adhesive layer to be described below.

As shown in FIG. 1, when the steel plate material is introduced into the production device 4 and the steel plate material is punched using the punching mold 7, the annular plate 1 is obtained. The annular plate 1 has an annular shape around the central axis C1. Here, the circumferential direction is a direction around the central axis C1.

(Second Process P2)

When the adhesive 8 is applied to the surface 1a of the annular plate 1 using the supply unit 15, an adhesive layer 9 is formed. The surface 1a is preferably a surface opposite to the surface to which the press oil and the primer are applied.

As the adhesive 8, an anaerobic adhesive, a heat curing adhesive, or a two-component reactive type curing adhesive can be used. In particular, an anaerobic adhesive is preferable because a high adhesive strength can be obtained. As the anaerobic adhesive, a room temperature-curable anaerobic adhesive can be used. The adhesive 8 is preferably an insulating material.

The anaerobic adhesive is an adhesive in which polymerization is performed and curing is performed when air is blocked in the presence of metal ions. For example, an acrylic adhesive (including, for example, dimethacrylates such as hydroxyalkyl methacrylate and urethane methacrylate, and epoxy acrylate) can be used.

A coating amount of the adhesive 8 forming the adhesive layer 9 can be, for example, 0.1 g/m$^2$ or more and 20 g/m$^2$ or less.

Figure 2:
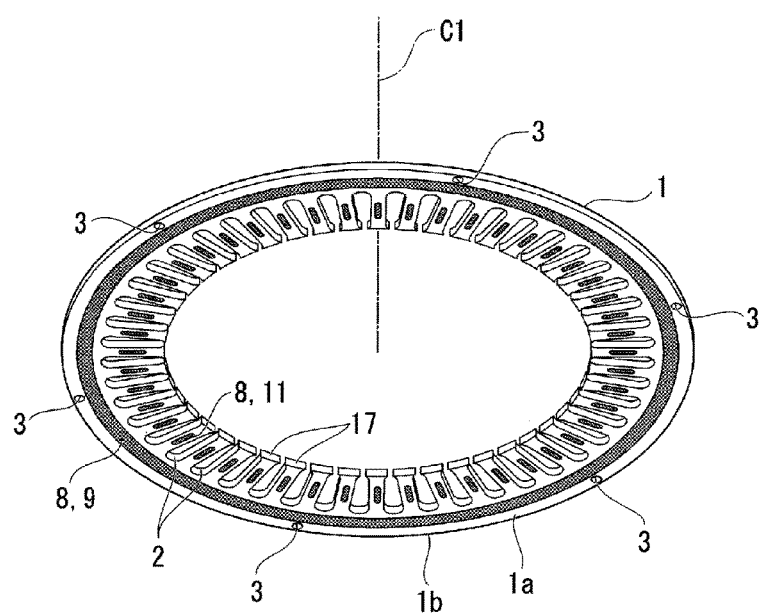
FIG. 2 is a perspective view of a steel plate on which an adhesive layer is formed.

As shown in FIG. 2, when the annular plate 1 and the laminate 12 are adhered in the third process P3, the adhesive 8 is applied so that the adhesive 8 (the adhesive layer 9) has a shape that is continuous in a circumferential direction around the central axis C1.

For example, the adhesive 8 can be applied to the surface 1a continuously in the circumferential direction around the central axis C1. Accordingly, the adhesive layer 9 has a shape that is continuous in the circumferential direction around the central axis C1. For example, in FIG. 2, the adhesive 8 is applied annularly around the central axis C1, and the adhesive layer 9 has an annular shape. When the adhesive 8 is applied so that the adhesive layer 9 has an annular shape, stress concentration is unlikely to occur when the laminate 12 is rotated in the third process P3.

Here, when the annular plate 1 and the laminate 12 are adhered in the third process P3, the adhesive 8 may be applied so that the adhesive 8 (the adhesive layer 9) has a shape that is continuous in the circumferential direction around the central axis C1.

The adhesive layer 9 can be formed in, for example, a band shape having a constant width. The adhesive layer 9 can be formed at a position close to an outer peripheral edge 1b of the surface 1a with a certain interval from the outer peripheral edge 1b. The adhesive layer 9 is preferably positioned radially inward from the insertion holes 3.

The thickness of the adhesive layer 9 can be, for example, 0.1 μm or more and 20 μm or less.

On the surface 1a, an adhesive layer 11 including the adhesive 8 may be formed in teeth 17. A shape of the adhesive layer 11 in a plan view is, for example, an oval shape in the radial direction.

(Third Process P3)

As shown in FIG. 1, in the lamination part 16, the annular plate 1(1A) in which the adhesive layer 9 is formed and the laminate 12 of another annular plate 1 are laminated while shifting positions around the central axis C1.

Figure 3:
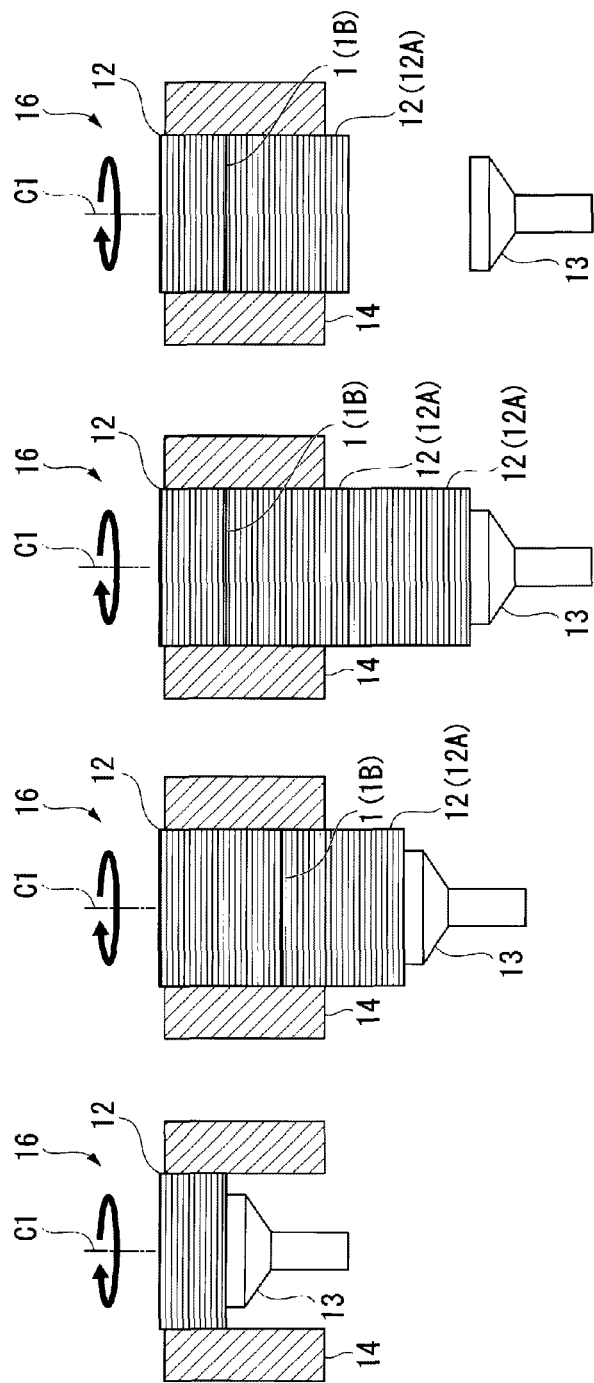
FIG. 3(A)-FIG. 3(D) are diagrams describing the production method of the laminated steel plate according to the first embodiment.

As shown in FIG. 3(A), for example, when a support 13 that supports the laminate 12 from below is rotated around the central axis C1 and thus a circumferential direction position of the laminate 12 is changed, circumferential direction positions of the annular plate 1 and the laminate 12 can be shifted.

Since the insertion holes 3 of the annular plate 1 (refer to FIG. 2) are positioned at locations that are rotationally symmetrical with respect to the central axis C1, as shown in FIG. 1, a rotation angle of the laminate 12 is preferably selected so that the positions of the insertion holes 3 match positions of the insertion holes 3 of the annular plate 1(1A). For example, in the annular plate 1 shown in FIG. 2, since six insertion holes 3 are positioned at equal distances in the circumferential direction, a rotation angle of the laminate 12 is preferably any of 60° and multiples thereof (that is, 60°, 120°, 180°, 240°, and 300°).

In this manner, laminating the annular plate 1 while relatively shifting positions around the central axis C1 with respect to the laminate 12 is referred to as rotational lamination.

As shown in FIG. 1, all of the annular plates 1 subjected to the second process P2 are preferably subjected to the third process P3. That is, for all of the plurality of annular plates 1 subjected to the second process P2 other than one plate, circumferential direction positions of the annular plate 1 and the laminate 12 are preferably different. Accordingly, in the stator core 10, deviation is unlikely to occur in a circumferential direction of a lamination thickness of the annular plate 1. In addition, flatness of the stator core 10 is favorable. Therefore, it is possible to increase dimensional accuracy of the stator core 10.

In the annular plate 1(1A) laminated on the laminate 12, a pressing pressure is applied to the laminate 12. Accordingly, the adhesive layer 9 of the annular plate 1(1A) is in close contact with the laminate 12 without gaps.

As shown in FIG. 3(A) and FIG. 3(B), when the first to third processes P1 to P3 are repeated, the number of laminated annular plates 1 in the laminate 12 increases.

The laminate 12 is disposed inside a tubular body 14 of the production device 4. Since the support 13 that supports the laminate 12 lowers according to an increase in the thickness of the laminate 12, a position of a top surface of the laminate 12 does not change.

As shown in FIG. 3(C), when the number of laminations of the laminate 12 reaches a predetermined number (for example, 100) that is determined in advance, no adhesive layer 9 is formed on the next annular plate 1(1B). Therefore, above the laminate 12 (a completed laminate 12A) having a predetermined number of laminated annular plates 1, the annular plate 1(1B) in which no adhesive layer 9 is formed is placed. The annular plate 1(1B) is the first one plate of the next laminate 12. In addition, when the first to third processes P1 to P3 are repeated, the number of laminations of new laminates 12 increases.

When the number of laminations of the laminates 12 increases, the completed laminate 12A gradually moves downward in the tubular body 14. As shown in FIG. 3(D), the completed laminate 12A which is discharged from the tubular body 14 is removed.

As shown in FIG. 3(A) to FIG. 3(D), when the adhesive layer 9 is cured while the laminate 12 moves downward, the annular plates 1 are adhered and fixed to each other with the adhesive layer 9 therebetween.

While the adhesive layer 9 is cured and the laminate 12 moves downward, since a circumferential direction position of the laminate 12 is shifted whenever the annular plate 1 is laminated, a shear force in the circumferential direction is applied to the adhesive layer 9 of the laminate 12.

In the production method of the present embodiment, the annular plates 1(1A) are laminated while shifting positions around the central axis C1 with respect to the laminate 12. In this case, the adhesive 8 is applied over a wide range in the circumferential direction around the central axis C1. Therefore, even if a shear force is applied to the adhesive layer 9 in the curing process, stress concentration is unlikely to occur, and inhibition of a curing reaction due to the shear stress is unlikely to occur. Therefore, the stator core 10 in which the annular plates 1 are firmly adhered and fixed to each other is obtained.

Since it is possible to minimize an amount of the adhesive 8 used without decreasing an adhesive strength of the adhesive layer 9, it is possible to reduce a time required for curing, increase a production speed, and reduce production costs. In addition, since the annular plates 1 are adhered and fixed to each other with the adhesive layer 9 therebetween, no conduction occurs between the annular plates 1 and an increase in loss can be prevented. In addition, since the process is simplified, productivity does not decrease.

In the production method of the present embodiment, as shown in FIG. 2, when the annular plate 1 and the laminate 12 are adhered in the second process P2, the adhesive 8 is applied so that the adhesive 8 (the adhesive layer 9) has a shape that is continuous in the circumferential direction around the central axis C1. Therefore, even if a shear force is applied to the adhesive layer 9 in the curing process, stress concentration is unlikely to occur. Therefore, inhibition of a curing reaction due to the shear stress is unlikely to occur. Therefore, since a curing reaction in the adhesive layer 9 occurs normally and an adhesive strength of the adhesive layer 9 increases, the stator core 10 in which the annular plates 1 are firmly adhered and fixed to each other is obtained. Therefore, it is possible to minimize an amount of the adhesive 8 used without decreasing an adhesive strength of the adhesive layer 9. Accordingly, it is possible to reduce a time required for curing, increase a production speed, and reduce production costs.

In the production method of the present embodiment, since the annular plates 1 are adhered and fixed to each other with the adhesive layer 9 therebetween, no conduction occurs between the annular plates 1 and an increase in loss can be prevented. In addition, since the process is simplified, productivity does not decrease.

In the production method of the present embodiment, since the first to third processes P1 to P3 are performed in the common production device 4, it is possible to increase productivity compared with a production method in which an operation of removing steel plates from a production device and laminating them is necessary.

According to the production device 4, the lamination part 16 laminates the annular plates 1(1A) while shifting positions around the central axis C1 with respect to the laminate 12. In this case, the adhesive 8 is applied over a wide range in the circumferential direction around the central axis C1. Therefore, even if a shear force is applied to the adhesive layer 9 in the curing process, stress concentration is unlikely to occur, and inhibition of a curing reaction due to the shear stress is unlikely to occur. Therefore, the stator core 10 in which the annular plates 1 are firmly adhered and fixed to each other is obtained.

Since it is possible to minimize an amount of the adhesive 8 used without decreasing an adhesive strength of the adhesive layer 9, it is possible to reduce a time required for curing, increase a production speed, and reduce production costs. In addition, since the annular plates 1 are adhered and fixed to each other with the adhesive layer 9 therebetween, no conduction occurs between the annular plates 1 and an increase in loss can be prevented. In addition, since the process is simplified, productivity does not decrease.

According to the production device 4, the supply unit 15 configured to apply the adhesive 8 so that the adhesive 8 has a shape that is continuous in the circumferential direction around the central axis C1 when the annular plate 1 and the laminate 12 are adhered is included. Since the adhesive 8 (the adhesive layer 9) has a shape that is continuous in the circumferential direction, even if a shear force is applied to the adhesive layer 9 in the curing process, stress concentration is unlikely to occur. Therefore, inhibition of a curing reaction due to the shear stress is unlikely to occur. Accordingly, since a curing reaction in the adhesive layer 9 occurs normally and an adhesive strength of the adhesive layer 9 increases, the stator core 10 in which the annular plates 1 are firmly adhered and fixed to each other is obtained. Therefore, it is possible to minimize an amount of the adhesive 8 used without decreasing an adhesive strength of the adhesive layer 9. Accordingly, it is possible to reduce a time required for curing, increase a production speed, and reduce production costs.

According to the production device 4, since the annular plates 1 are adhered and fixed to each other with the adhesive layer 9 therebetween, no conduction occurs between the annular plates 1 and an increase in loss can be prevented. In addition, since the process is simplified, productivity does not decrease.

[Method of Producing a Laminated Steel Plate] (Second Embodiment)

Figure 5:
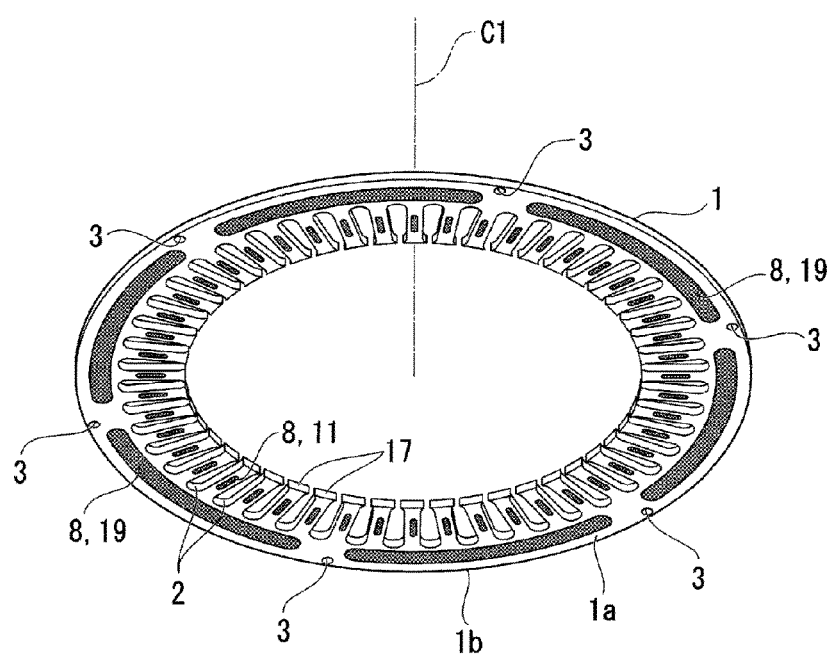
FIG. 5 is a perspective view of a steel plate on which an adhesive layer is formed.

An application shape of the adhesive 8 in the second process P2 is not limited to a shape in which the adhesive 8 (an adhesive layer 19) has an annular shape when the annular plate 1 and the laminate 12 are adhered in the third process P3. For example, as shown in FIG. 5, the application shape of the adhesive 8 may be a shape in which the adhesive 8 (the adhesive layer 9) has an arc shape around the central axis C1 in the third process P3. For example, in FIG. 5, the adhesive 8 is applied to the surface 1a to have a plurality of arc shapes and the adhesive layer 19 has a plurality of arc shapes.

The adhesive layer 19 has a shape obtained by dividing the adhesive layer 9 shown in FIG. 2 into a plurality of parts in a lengthwise direction. The number of adhesive layers 19 (that is, the number of divisions) can be 6 or less (for example, 2 to 6). When the number of adhesive layers 19 is set to 6 or less, it is possible to reduce the number of ends of the adhesive layer 19 in which stress concentration is likely to occur when the laminate 12 is rotated and inhibition of a curing reaction due to shear stress can be made unlikely to occur.

The adhesive layers 19 are preferably provided at rotationally symmetric positions of n-fold symmetry (n is an integer of 2 or more) with respect to the central axis C1. The circumferential lengths of the adhesive layers 19 are preferably the same.

When it is described that a shape is continuous in the circumferential direction, for example, in FIG. 5, it has a circumferential length equal to or longer than a length corresponding to a circumferential length of a combination of one tooth 17 and adjacent slots 2, 2. The circumferential length of the adhesive layer 19 is preferably a length at which a central angle of a fan shape formed by the central axis C1 and the adhesive layer 19 in a plan view is 20° or more (preferably 30° or more).

In the production method of the second embodiment, in the same manner as in the first embodiment, since the adhesive 8 is applied so that the adhesive 8 (the adhesive layer 9) has a shape that is continuous in the circumferential direction around the central axis C1 when the annular plate 1 and the laminate 12 are adhered, even if a shear force is applied to the adhesive layer 19 in the curing process, stress concentration is unlikely to occur. Therefore, inhibition of a curing reaction due to the shear stress is unlikely to occur.

Accordingly, it is possible to minimize an amount of the adhesive 8 used without decreasing an adhesive strength of the adhesive layer 19. Therefore, it is possible to reduce a time required for curing, increase a production speed, and reduce production costs.

In addition, since the annular plates 1 are adhered and fixed to each other with the adhesive layer 19 therebetween, no conduction occurs between the annular plates 1 and an increase in loss can be prevented. In addition, since the process is simplified, productivity does not decrease.

EXAMPLES

Example 1

As shown in FIG. 1, when the steel plate material was introduced into the production device 4 and punched, the annular plate 1 was obtained (the first process P1).

Figure 6A:
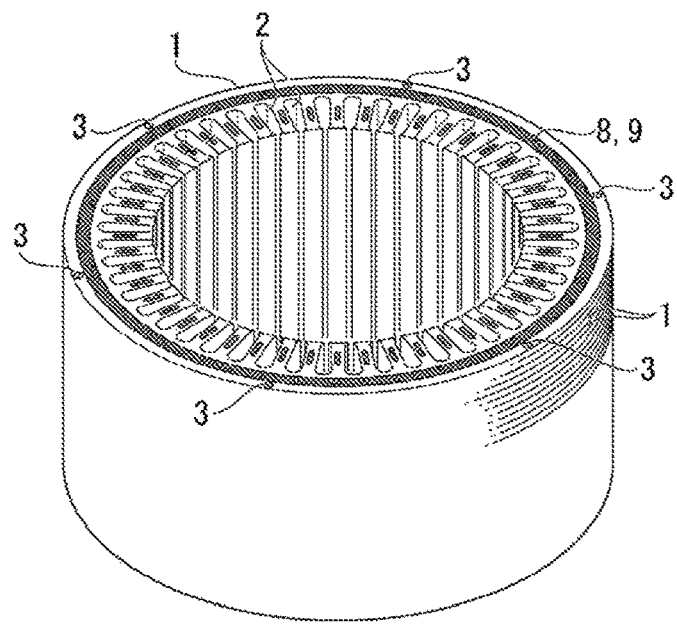
FIG. 6(A) is a perspective view of a structure of a laminate obtained by a production method according to Example 1.

As shown in FIG. 6(A), when the adhesive 8 which is an acrylic anaerobic adhesive (curable at room temperature) was applied annularly to the surface 1a of the annular plate 1 around the central axis C1, the annular adhesive layer 9 was formed (the second process P2).

As shown in FIG. 3(A) to FIG. 3(D), the annular plate 1 was laminated while the laminate 12 was rotated 60° around the central axis C1 (the third process P3). In the third process P3, circumferential direction positions of the annular plates 1 constituting the completed laminate 12A were shifted 60° with respect to the adjacent annular plate 1.

Figure 6B:
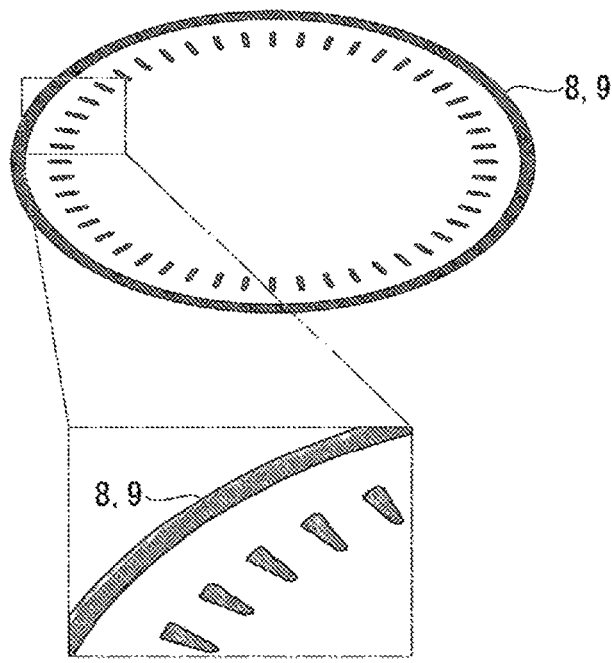
FIG. 6(B) is a perspective view schematically showing an adhesive layer.
Figure 9:
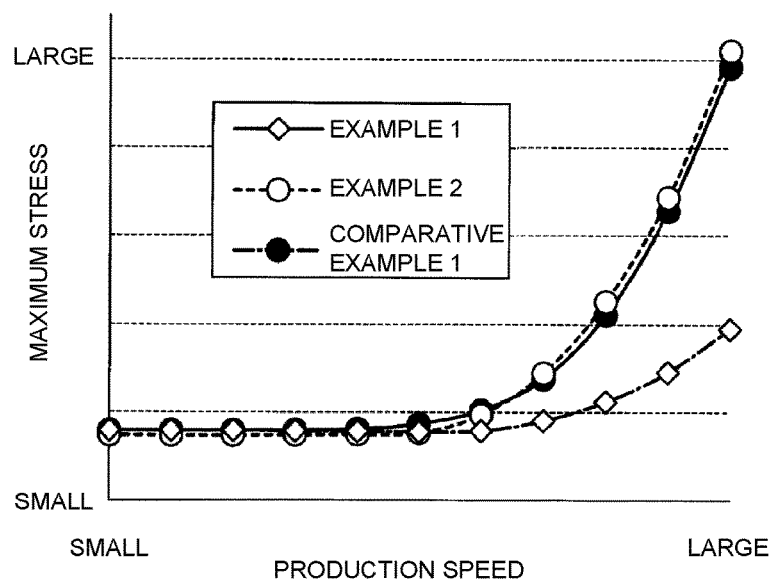
FIG. 9 shows graphs of test results.

Stress generated in the adhesive layer 9 when the laminate 12 was 60° rotated was calculated using a model. The results are shown in FIG. 6(B) and FIG. 9. In FIG. 6(B), stress generated in the adhesive layer 9 is indicated by shading. The darker color indicates greater stress. In FIG. 9, the vertical axis represents maximum stress, and the horizontal axis represents a production speed (the number of annular plates 1 punched per unit time).

As shown in FIG. 6(B) and FIG. 9, the maximum stress generated in the adhesive layer 9 was small.

Example 2

Figure 7A:
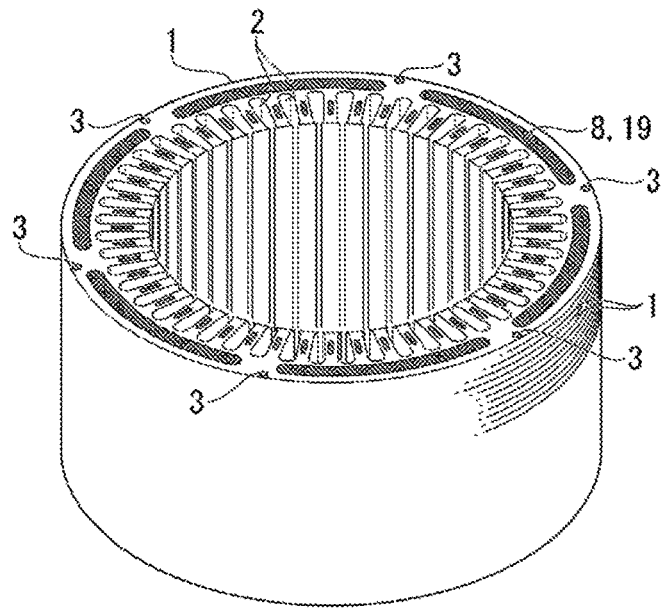
FIG. 7(A) is a perspective view of a structure of a laminate obtained by a production method according to Example 2.

As shown in FIG. 7(A), the adhesive layer 19 was formed in the same manner as in Example 1 except that application shapes of the adhesive 8 were a plurality of (6) arc shapes. An area (application area) of the adhesive layer 19 was the same as that of the adhesive layer 9 of Example 1. The other conditions were the same as in Example 1.

Figure 7B:
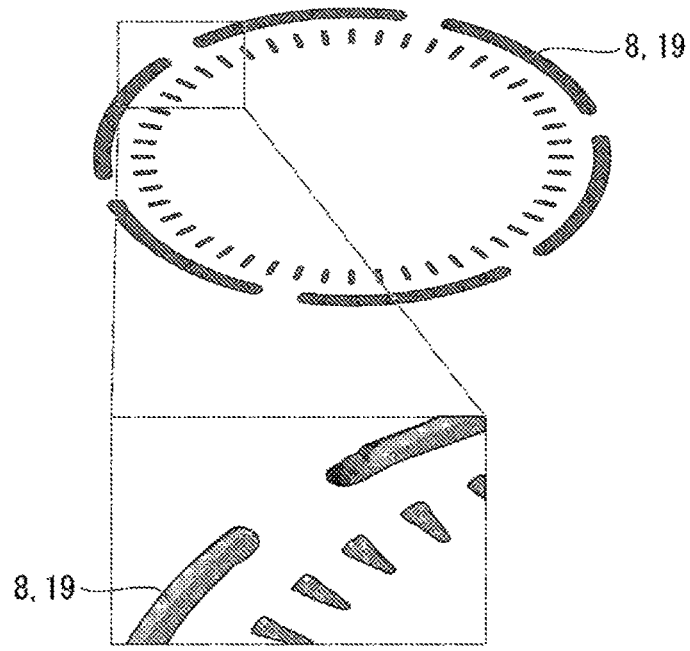
FIG. 7(B) is a perspective view schematically showing an adhesive layer.

In the same manner as in Example 1, stress generated in the adhesive layer 19 when the laminate 12 was rotated was calculated using a model. The results are shown in FIG. 7(B) and FIG. 9.

As shown in FIG. 9, the maximum stress (stress generated at an arcuate end of the adhesive layer 19) generated in the adhesive layer 19 was larger than in Example 1. However, as shown in FIG. 7(B), since parts (dark parts) in which stress was higher were only six arcuate ends of the adhesive layer 19, stress was kept low as a whole.

Comparative Example 1

Figure 8A:
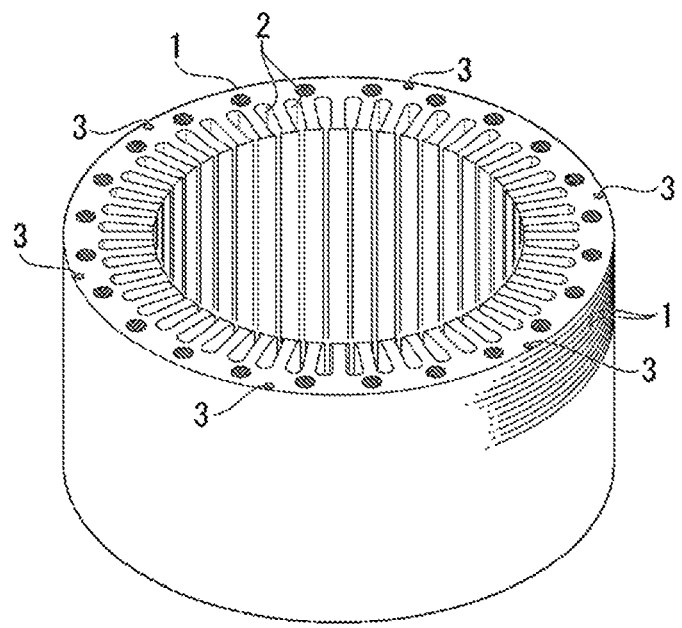
FIG. 8(A) is a perspective view of a structure of a laminate obtained by a production method according to Comparative Example 1.

As shown in FIG. 8(A), an adhesive layer 29 was formed in the same manner as in Example 1 except that application shapes of the adhesive 8 were a plurality of (42) dot shapes. An area (an application area) of the adhesive layer 29 was the same as that of the adhesive layer 9 of Example 1. The other conditions were the same as in Example 1.

In the same manner as in Example 1, stress generated in the adhesive layer 29 when the laminate 12 was rotated was calculated using a model. The results are shown in FIG. 8(B) and FIG. 9.

Figure 8B:
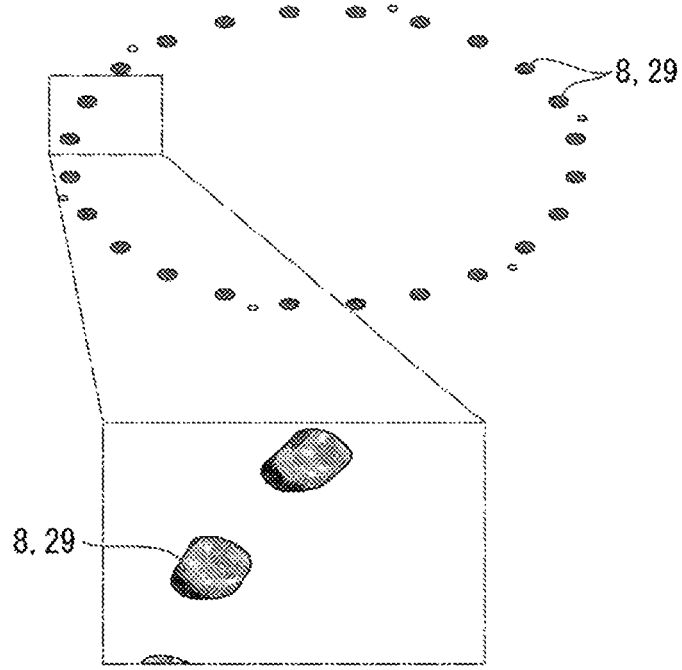
FIG. 8(B) is a perspective view schematically showing an adhesive layer.

As shown in FIG. 8(B) and FIG. 9, the maximum stress generated in the adhesive layer 29 was larger than in Example 1.

In addition, all of the plurality of dot-like adhesive layers 29 had parts (dark parts) in which stress was higher. Since the number of adhesive layers 29 was large, a total generated stress was larger than those of Examples 1 and 2.

Here, the invention is not limited to the above-described embodiments, and various design modifications can be made without departing from the spirit and scope thereof.

For example, although in the production method of the above-described embodiment, for the annular plates 1 subjected to the second process P2, circumferential direction positions of the annular plate 1 and the laminate 12 are shifted, the present invention is not limited thereto, and there may be a method (so-called block rotational lamination) in which circumferential direction positions of the annular plate 1 and the laminate 12 are shifted for only some plates of the annular plates 1 subjected to the second process P2. For example, for the annular plates 1 subjected to the second process P2, it is possible to shift circumferential direction positions of the annular plate 1 and the laminate 12 at a ratio of one plate to a plurality of plates.

In the production method of the first embodiment, the adhesive layer that is continuous in the circumferential direction is formed on a surface of the steel plate. The number of adhesive layers is not limited to 1. For example, at a position different from that of the adhesive layer in the radial direction, a second adhesive layer having a shape that is continuous in the circumferential direction may be formed. The second adhesive layer may have an annular shape (refer to FIG. 2) or may have a plurality of arc shapes (refer to FIG. 5).

In the production method of the first embodiment, all of the steel plates are adhered and fixed to each other using an adhesive. However, the present invention is not limited thereto. Some steel plates of the plurality of steel plates constituting the laminated steel plate may be fixed to other steel plates using another method (for example, welding) instead of the adhesive.

The laminated steel plate obtained in the production method according to the embodiment may be applied to not only the stator core but also, for example, a rotor.

In the production method according to the embodiment, an object on which the annular plates 1(1A) are laminated in the third process P3 is the laminate 12 including the plurality of annular plates 1. However, the annular plate 1(1A) may be laminated on one annular plate 1.

In the coating process of the production method, when a steel plate and another steel plate are adhered using an adhesive in the laminating process, the adhesive is preferably applied so that the adhesive has a shape that is continuous in the circumferential direction around the axis.

The coating unit of the production device is preferably configured to apply an adhesive so that the adhesive has a shape that is continuous in the circumferential direction around the axis when the lamination unit adheres a steel plate and another steel plate using an adhesive.

What is claimed is:

1. A method of producing a laminated steel plate by laminating a plurality of steel plates, comprising:

a coating process in which an adhesive is applied to a surface of the steel plate, wherein the steel plate is an annular plate that comprises a plurality of insertion holes that are formed at intervals at an outer peripheral edge in a circumferential direction of a central axis of the annular plate and a plurality of coil slots that are formed at intervals at an inner peripheral edge in the circumferential direction of the central axis of the annular plate, and the inner peripheral edge is located closer to the central axis than the outer peripheral edge of the annular plate; and a laminating process in which the steel plate to which the adhesive is applied and another steel plate are laminated while shifting positions around an axis in a thickness direction of the steel plate and the steel plate to which the adhesive is applied and the other steel plate are adhered using the adhesive, wherein in the coating process the adhesive is applied at a plurality of positions located at an inner peripheral side of the plurality of slots and an outer peripheral side of the plurality of insertion holes, and the adhesive is laminated to be annular in the laminating process.

2. The method of producing a laminated steel plate according to claim 1,
wherein, in the coating process, the adhesive is applied annularly to a surface of the steel plate.

3. The method of producing a laminated steel plate according to claim 2,
wherein all of the steel plates to which the adhesive is applied in the coating process are subjected to the laminating process.

4. The method of producing a laminated steel plate according to claim 3,
wherein the coating process and the laminating process are performed in a common production device.

5. The method of producing a laminated steel plate according to claim 2,
wherein the coating process and the laminating process are performed in a common production device.

6. The method of producing a laminated steel plate according to claim 1,
wherein all of the steel plates to which the adhesive is applied in the coating process are subjected to the laminating process.

7. The method of producing a laminated steel plate according to claim 6,
wherein the coating process and the laminating process are performed in a common production device.

8. The method of producing a laminated steel plate according to claim 1,
wherein the coating process and the laminating process are performed in a common production device.

9. The method of producing a laminated steel plate according to claim 1,
wherein in the coating process the adhesive is applied in a plurality of teeth formed at the plurality of slots, and the adhesive is coated to extend in the circumferential direction of the steel plate.

10. A device for producing a laminated steel plate by laminating a plurality of steel plates, comprising:
a nozzle device configured to apply an adhesive to a surface of the steel plate, wherein the steel plate is an annular plate that comprises a plurality of insertion holes that are formed at intervals at an outer peripheral edge in a circumferential direction of a central axis of the annular plate and a plurality of coil slots that are formed at intervals at an inner peripheral edge in the circumferential direction of the central axis of the annular plate, and the inner peripheral edge is located closer to the central axis than the outer peripheral edge of the annular plate; and a lamination device configured to laminate the steel plate to which the adhesive is applied and another steel plate while shifting positions around an axis in a thickness direction of the steel plate and adhere the steel plate to which the adhesive is applied and the other steel plate using the adhesive, wherein the nozzle device is configured to apply the adhesive at a plurality of positions located at an inner peripheral side of the plurality of slots and an outer peripheral side of the plurality of insertion holes so that the adhesive is laminated to be annular when the adhesive is laminated by the lamination device.

11. The device for producing a laminated steel plate according to claim 10,
wherein the nozzle device is configured to apply the adhesive in a plurality of teeth formed at the plurality of slots, such that the adhesive is coated to extend in the circumferential direction of the steel plate.

* * * * *